Feb. 16, 1960
H. T. WESTERHEIM
2,924,965
LEAKAGE DETERMINING APPARATUS
Filed June 28, 1957
3 Sheets-Sheet 1
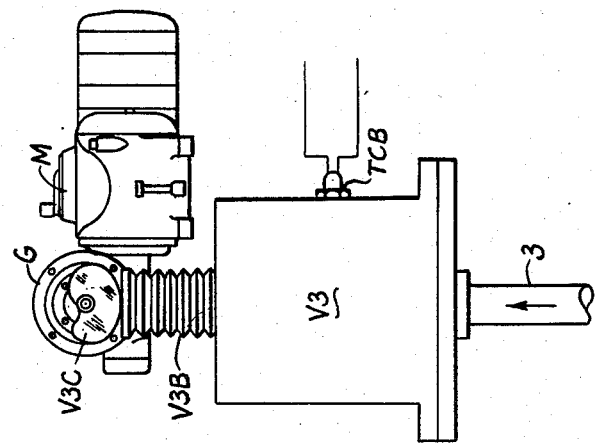
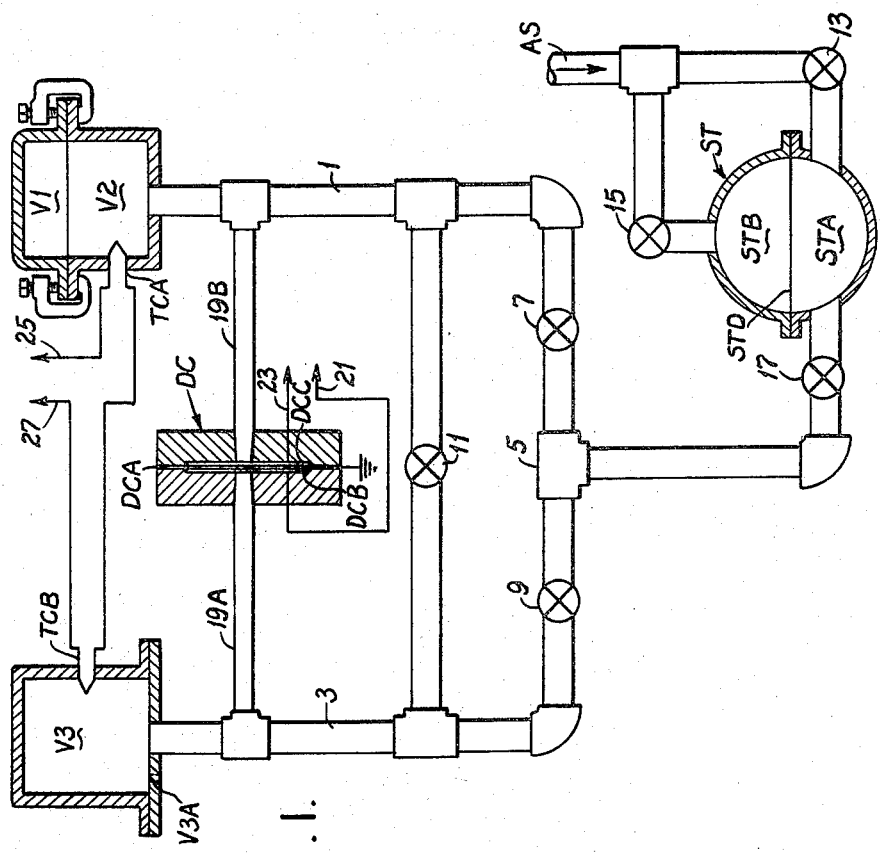

Harold T. Westerheim, Inventor.
Koenig and Pope, Attorneys

United States Patent Office 2,924,965
Patented Feb. 16, 1960

2,924,965

LEAKAGE DETERMINING APPARATUS

Harold T. Westerheim, Garland, Tex., assignor, by direct and mesne assignments, of one-half to Foster M. Poole and one-half to Carl Casey, both of Dallas, Tex.

Application June 28, 1957, Serial No. 668,703

5 Claims. (Cl. 73—40)

This invention relates to apparatus for leakage determination, and more particularly to apparatus for detecting and measuring pneumatic leaks in containers.

Among the several objects of this invention may be noted the provision of leakage-determining apparatus which will accurately detect and measure minute pneumatic leaks in containers of any size or configuration; the provision of apparatus of the class described which will rapidly indicate the magnitude of such pneumatic leaks; and the provision of such apparatus in which any temperature-induced errors in leakage magnitude are automatically corrected. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, Fig. 1 is a schematic diagram of the mechanical components of the leakage-determining apparatus of the present invention;

Fig. 2 is an elevation of a mechanical component used in another embodiment of our invention;

Corresponding reference characters indicate corresponding parts throughout the several views of the drawings.

Figure 3:
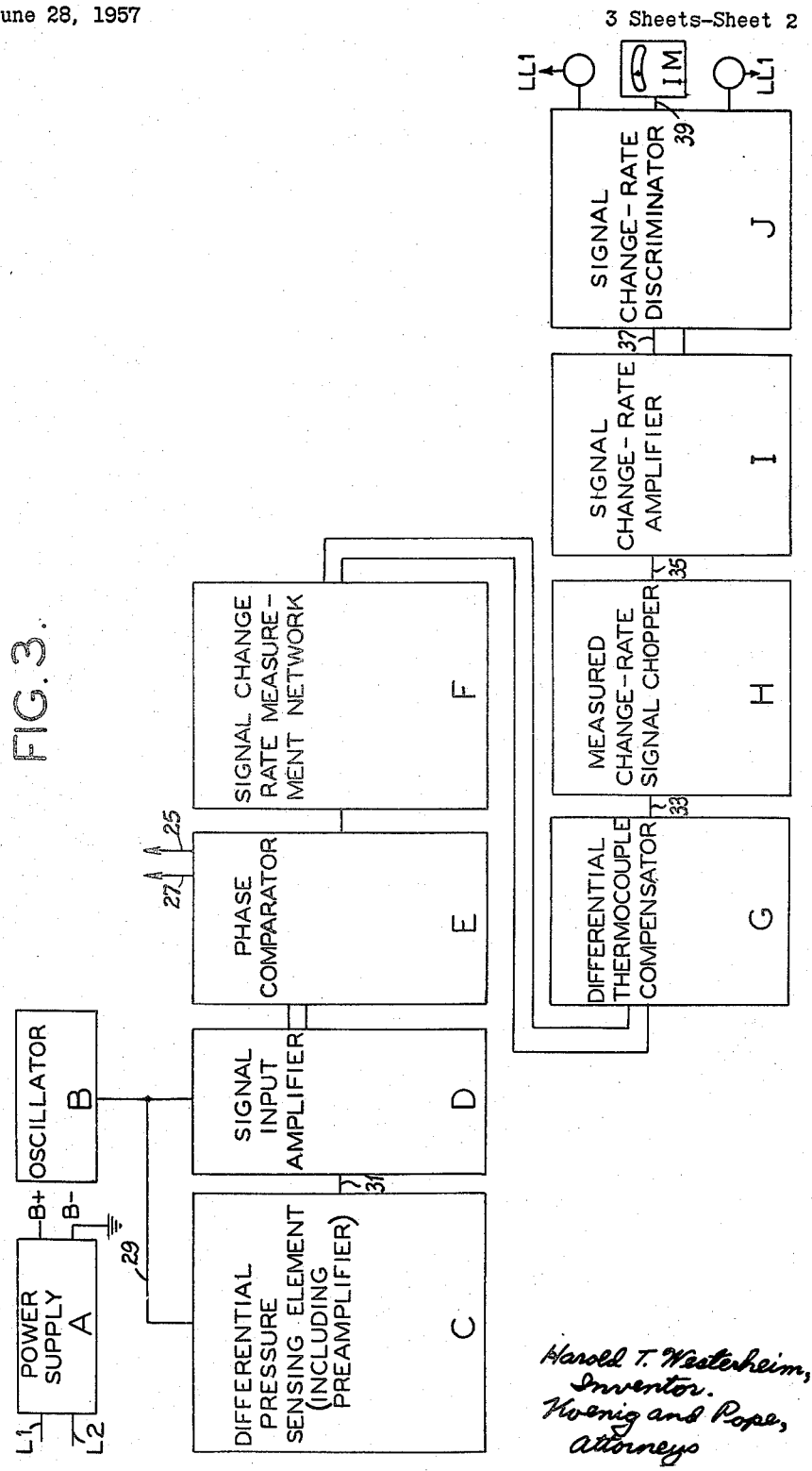
Fig. 3 is a block diagram of the electrical components associated with the mechanical components illustrated in Figs. 1 and 2; and, Fig. 4 is a circuit diagram of certain electrical components of Fig. 3.

In many industries, it is necessary to determine whether certain structures and systems are gas-tight, or, if not, have a leakage within a certain selected tolerance limit. For example, in the automotive industry, many components such as manifolds, carburetors, air-suspension systems, etc., must be pneumatically sealed or have at the maximum only a minute leakage. Conventional procedures and apparatus for determination of leakage have a number of disadvantages in indicating and measuring leaks in such structures, such as their inability to detect or measure very small leaks with accuracy; the relatively long periods of time which are required to make tests; and the inability to correct or compensate for temperature-induced errors in leakage measurement.

In accordance with the present invention, these disadvantages have been overcome and apparatus is provided which can in a very few seconds determine with excellent accuracy even minute pneumatic leaks in containers (i.e., any closed pneumatic, i.e., gas-tight, system) of large volume, the measurement of which is corrected for any temperature-induced errors. I have found that I can accomplish this by initially applying equal pneumatic pressures to a container of known leakage characteristics and a container to be tested, then determining the rate of relative pressure change in these two containers at the end of a predetermined short time interval (i.e., the slope of the curve of relative pressure change vs. time), converting the resulting rate into an electrical signal, and then impressing that signal on an indicator which is calibrated in leakage units, such as percentage of free air per hour. Preferably, the master container and the sample container system each have a thermocouple positioned in heat-exchange relationship thereto, which thermocouples are connected into the electronic circuit components whereby any errors due to any temperature differential between the two containers are corrected. My apparatus, unlike existing devices, can therefore be employed in the production-line testing of gas-tight containers where minute leaks must be detected and accurately measured, allowing only a period of a few seconds from the inception to the completion of any testing cycle.

Referring now to Fig. 1, a container, the gas-tightness or pneumatic leakage of which is to be tested, is indicated at reference character V1. This container is temporarily attached to a ballast volume or cavity indicated at V2, thereby forming a cavity V1+V2 having a volume approximately equal to that of a master container or cavity V3. V3 has a small precisely bored aperture V3A which may be sealed, if desired. Air lines or pipes 1 and 3 interconnect volumes V1+V2 and V3 together at a T 5 via two valves 7 and 9. Pipes 1 and 3 are also interconnected by a valve 11. Air under pressure is supplied to T 5 from an air supply indicated at AS to a first section STA of a surge tank or accumulator ST via a valve 13. A second compartment or section STB of the surge tank may also be supplied from AS via valve 15. The two sections of ST are separated by a diaphragm STD. Another valve 17 is interposed in the air supply line between accumulator section STA and T 5.

The gas, i.e. air, pressures in lines 1 and 3 respectively are applied by means of pipes 19A and 19B to opposite sides of an electrical pressure sensing unit as constituted by a differential capacitor DC. This sensing unit comprises a movable metallic diaphragm DCA, such as copper beryllium foil, spaced between and electrically insulated from two parallel metallic plates DCB and DCC. The instantaneous positioning of the diaphragm DCA, when valves 7, 9 and 11 are closed, is dependent on the differential pressures between V1+V2 and V3 at any particular moment. The diaphragm DCA is grounded and the opposing electrodes of the differential condenser are connected via wires 21 and 23 to the electrical components of the present invention, as will be described hereinafter. A pair of thermocouples TCA and TCB are positioned in heat exchange relationship to the V1+V2 and V3 volumes or containers respectively. These thermocouples are series-connected in a loop circuit and the electrical leads interconnecting these thermocouples to the electrical components of this apparatus are referred to at 25 and 27.

Referring now to Fig. 2, an alternate master container or volume V3 is shown. Instead of being sealed, or having an orifice V3A of predetermined precise dimensions such as illustrated in Fig. 1, the Fig. 2 embodiment has an "artificial" or "simulated" leak provided by a bellows V3B and a cam V3C. A synchronous motor M and a speed reduction gear box G drive cam V3C at a precisely controlled slow rate of rotation to permit a constant rate of expansion (or contraction) of bellows V3B, thus simulating a container V3 with a predetermined amount of pneumatic leakage.

Figure 4:
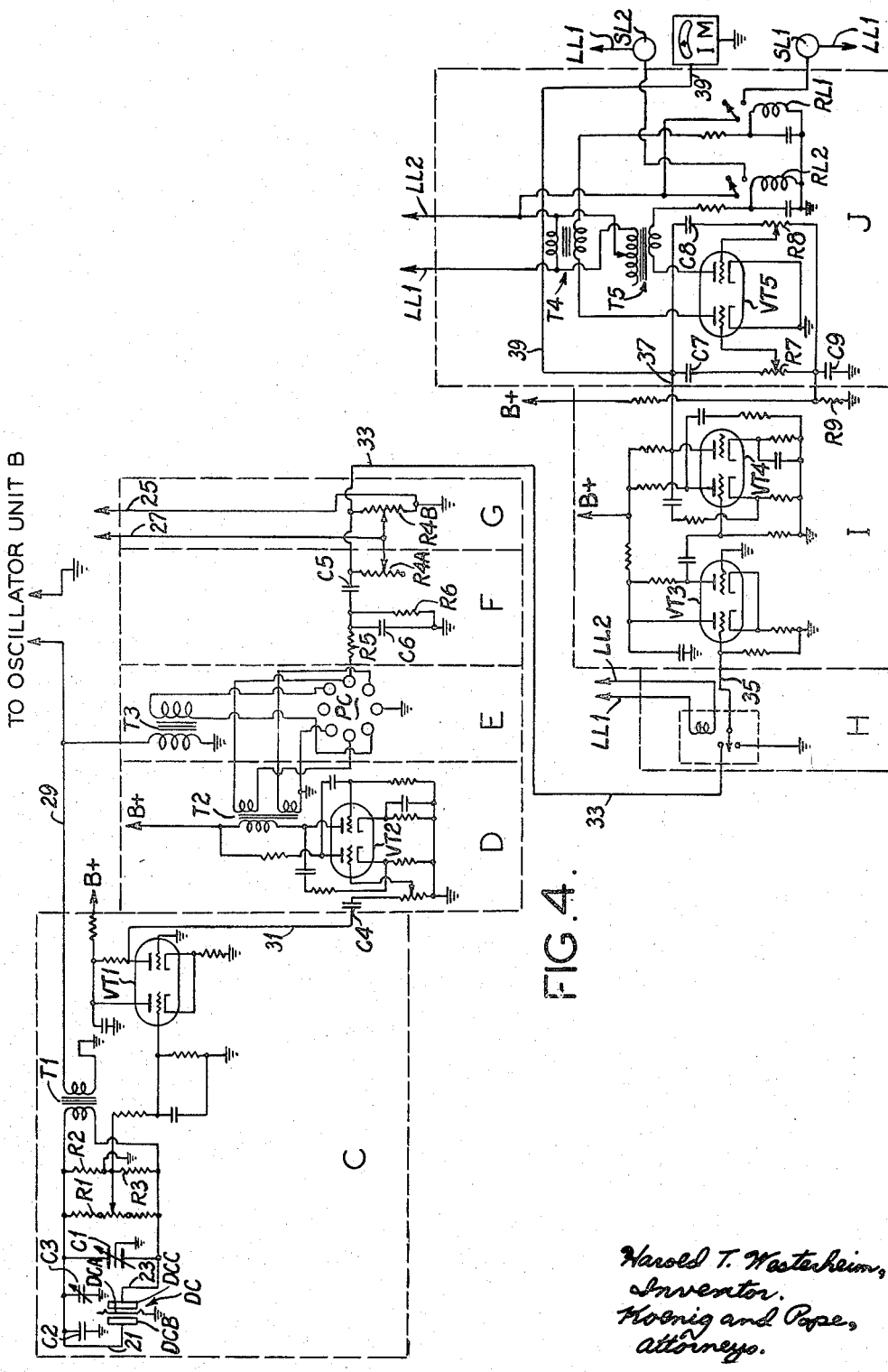

The electrical components of my apparatus are shown in Figs. 3 and 4. In the latter illustration, unit C includes the differential capacitor DC connected in a capacitance bridge which also includes a two-section variable condenser C1, a fixed capacitance C2 and another variable condenser C3. The former and latter two units and a potentiometer R1 provide for calibration adjustment. An A.C. signal source of a constant frequency (e.g., 4 kc.) and constant amplitude is supplied to the primary of a transformer T1 of unit C via a wire 29 from an oscillator unit B. As any conventional oscillator unit is satisfactory for the purposes of this invention and those skilled in this art are familiar with such units, no specific circuit diagram is included. For the same reason no detailed circuitry of the power supply (preferably of the regulated type) unit A is set forth.

The secondary of transformer T1 is connected to a pair of resistances R2 and R3 which, it will be noted, are shunt-connected across potentiometer R1 and the capacitance bridge.

The output of the bridge, as constituted by ground and the rotor of potentiometer R1, provides an A.C. signal to the grid of a duo-triode vacuum tube VT1 of a preamplifier, the amplified output of which is capacitively coupled by means of a wire 31 and a condenser C4 to the grid circuit of a conventional two-stage A.C. amplifier unit D, which includes a duo-triode vacuum tube VT2. The second of the two cascaded amplifier stages of VT2 supplies two amplified identical A.C. signals to the terminals of a diode phase comparator PC from the twin secondaries of a coupling transformer T2. This phase comparator PC, together with a coupling transformer T3, constitutes unit E. Transformer T3 supplies a reference A.C. voltage from oscillator unit B. The other (twin) A.C. signal input to comparator PC differs from that of the reference signal from the secondary of T3 only by phase and amplitude differences due to any unbalance of the capacitance bridge of unit C which is a function of the instantaneous positioning of diaphragm DCA. The comparator network PC of unit E produces from these input signals a D.C. output signal which is a function of the product of amplitude and cosine of the phase angle difference between the A.C. reference voltage input from T3 and the twin A.C. signal voltage inputs from T2. This D.C. signal is applied across an RC circuit comprising a condenser C5 and a pair of ganged potentiometers R4A and R4B. This RC circuit, two additional resistors R5 and R6, and a condenser C6 constitute a signal change-rate measurement network unit F.

The time constant of the RC circuit is relatively short and condenser C5 is able to follow the D.C. output signal potential variations by drawing current through resistor R6. The charging current is, therefore, proportional to the rate of change of the D.C. signal from unit E, which is proportional to the size of a leak in V1. Thus, the D.C. voltage developed across potentiometer R4A has an amplitude proportional to the rate of change of the D.C. signal from unit E, which is proportional to the rate of change of the diaphragm DCA, and therefore to the magnitude of the V1 leak. The polarity of this D.C. voltage signal developed across R4A is determined by the ± direction of diaphragm DCA.

The other section R4B of the dual potentiometer is connected by wires 25 and 27 to the thermocouples TCA and TCB. If there is any differential in the temperatures of container V1+V2 and V3, then a potential proportional to this difference is algebraically added to the D.C. leak signal across R4A. It will be understood that if temperature differences are negligible, or if stable temperature conditions are reached before each test, unit G may be omitted and a single section potentiometer R4A would be used, its lower connection being directly returned to ground rather than indirectly through R4B.

This temperature compensated D.C. signal, proportional in amplitude to the amount of leakage in V1, is coupled by a wire 33 (and a common ground connection) to a measured change-rate signal chopper unit H. This unit H comprises simply a pulser or an A.C. operated vibrating reed type switch which intermittently (at the frequency of A.C. power source LL1 and LL2) vibrates between wire 33 and a wire 35 and grounds the latter during a portion of the cycle. The action of unit H thereby converts the D.C. signal of wire 33 into a wave form which is suitable for and can be accommodated by the signal change-rate amplifier unit I. This unit is constituted by a conventional three-stage amplifier comprising two duo-triode vacuum tubes VT3 and VT4 and the customary associated resistor and capacitor components.

The amplified A.C. output signal of unit I is connected by a wire 37 and a conductor 39 to an indicating meter IM which may be calibrated in any desired units to indicate the magnitude of the leak in V1. In some instances, such as where a container V1 is tested under conditions where the leak may cause an increase in pressure in V1 rather than a pressure decrease relative to V3, then it is desirable to know not only the magnitude of leakage, but whether it is a plus or minus leakage. This knowledge is particularly desirable if a dual or multicavity container is to be tested. One of the cavities would then have air pressure applied at a value greater than the equal initial air pressures applied to the master container V3 and the second test cavity. A rise in pressure in the second test cavity would indicate a leak between the first and second cavities in the tested container, whereas a leak between the second cavity and a third cavity or the outside atmosphere would be indicated by a falling pressure in the second test cavity. In either instance, the magnitude of the leak is indicated on IM and provision is made in unit J to indicate whether a pressure rise or fall is occurring.

To accomplish this, the amplified A.C. output signal of unit I (via conductor 37 and ground) is also impressed across two RC circuits (C7—R7 and C8—R8) to ground via a resistor R9 shunted by a condenser C9. Resistors R7 and R8 are potentiometers and their parameters are normally adjusted to provide equal amplitude signals to the respective grids of duo-triode vacuum tube VT5. The anodes of each of the two sections of tube VT5 are connected to two relays RL1 and RL2 through the secondaries of two transformers T4 and T5. The other connections of relays RL1 and RL2 are returned to ground. The primaries of transformers T4 and T5 are supplied by a source of A.C. power, such as LL1 and LL2, and are connected 180° out of phase, thus providing a conducting type of phase discriminator. The conduction of either of the sections of tube VT5 (and the resulting actuation of either of the coils of relays RL1 and RL2) is dependent on the phase angle of the incoming signal from unit I. Thus, if the D.C. signal from unit G is of such an amplitude that it exceeds a predetermined level (equal to a maximum leak tolerance) then one of the two relays RL1 or RL2 will be energized closing the respective relay contacts and energizing the appropriate signal light SL1 or SL2. Which section of tube VT5 conducts and which signal light is energized depend on the phase angle of the A.C. signal from unit I. Thus a leak in V1, which results in an increased pressure in V1 relative to V3, can be distinguished from a leak in V1 which causes a decreased pressure in V1 relative to V3. The meter IM indicates the size or magnitude of the leak in V1. It is preferred that relays RL1 and RL2 be adjustable so that different tolerance limits can be established.

Operation is as follows:

The container V1 to be tested is clamped to ballast volume or container V2, and valves 17 and 15 are closed. Air under pressure is admitted to the lower compartment STA of surge tank ST by opening valve 13. After a few seconds time has elapsed to stabilize the charge of pressurized air in STA, valves 7, 9, 11, 15 and 17 are opened. The pressure in STB forces air from STA into V3 and V1+V2 to establish initially equal pressures in these two containers or cavities. Valves 7, 9 and 11 are then closed and any change in pressures between V1+V2 and V3 results in movement of the central diaphragm or electrode DCA. If the aperture V3A is closed and V1+V2 is without a leak there will be no differential pressure to cause movement of DCA. On the other hand, if V3A is open then there will be a pressure drop in V3A, the rate of which is a function of the dimensions of V3A. If there is a leak in V1 there will also be a pressure drop in V1+V2. The relative changes in differential pressure across DC will establish movement of DCA, the rate of movement of which is a function of the magnitude of the leak, and the direction of movement being an indication of the size of the leak in V1 relative to the predetermined leak in V3. The action of the moving diaphragm DC on the capacitance bridge in unit C and the action of the components in units D, E and F, as described above, provide a D.C. signal, the amplitude of which is a function of the magnitude of the leak. Temperature compensation, if desired, is taken care of by unit G which algebraically adds a D.C. component to this D.C. signal to correct for any temperature differential between the master and tested containers.

By adjusting the various variable components of the preceding units, meter IM is preset so that its scale represents leakage magnitudes in any desired units. In one manner of using the apparatus of this invention, V3A is sealed and any leak in V1 will cause an indication on meter IM. A second way of using the apparatus would be to open V3A and any leak in V1 greater than that in V3 would be indicated on meter IM. Thus V3A would establish a predetermined tolerance threshold. In latter type of operation, it may be desirable to use a comparator such as unit J to be sure the leak magnitude indicated on meter IM is due to V1's leak being greater instead of less than that caused by leakage from V3A. Alternatively, the bellows V3B (Fig. 2) can be used as an artificial or simulated leak for V3 to establish a tolerance threshold that is adjustable. Thus, a leak in a single cavity container V1 can be indicated above any tolerance threshold including zero, and any leakage between two cavities in a container and between one of these cavities and the atmosphere or a third cavity can be indicated by this apparatus as to magnitude and (if the comparator of unit J is used) to direction.

The sensitivity and accuracy of my apparatus are such that gas leaks in a container that would cause a pressure loss of only .05 of 1% per hour, is indicated. Also, the apparatus is extremely stable and it is substantially insensitive to varying electrical, mechanical, temperature, etc., variations. This is primarily due to units C—G. For example, it will be noted that, since the voltage drop across R4A (unit F) is pure D.C. and proportional to the size of the leak in V1, any nonchanging charge across condenser C5 (resulting from any unbalance such as a distorted diaphragm DCA, or a shift in the zero position of this diaphragm, or frequency drift of the oscillator unit B, or any other maladjustment that causes a nonchanging D.C. level at condenser C5) has no effect on the accuracy of leakage measurement. Thus, the operator of the apparatus does not have to raise the air pressure in V3 and V1+V2 to the same initial pressure level for each testing operation. Also, because the total change of pressures between V3 and V1+V2 over a fixed period of time is not employed as a criterion but only the rate of relative pressure change is used (i.e., measurement of the slope of the pressure change curve at the end of a predetermined short time interval rather than the amount of pressure change), the measurement of leakage is practically instantaneous. A typical testing cycle including the clamping and unclamping of a container to be tested runs in the order of ten seconds.

It will be understood that the ballast volume V2 can be omitted, and in fact in many instances (especially where the container V1 to be tested has a substantial volume), it is preferred to compare the test container per se directly against a master container. Also, the word "pneumatic" as used herein includes not only air, but other gases, all being substantial equivalents for the purposes of this invention.

It is to be noted that valves 7, 9, 11, 13, 15 and 17 are preferably electrically operated solenoid type valves. Further, it is to be understood that customary venting arrangements are associated with the valves to rapidly release the gas pressures between testing cycles.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Apparatus for determining pneumatic leakage comprising a master container, means for initially applying equal pneumatic pressures to said master container and a second container the pneumatic leakage of which is to be determined, a sensing unit pneumatically connected between said pressurized containers and including a pair of fixed parallel metallic plates with a metallic diaphragm interposed therebetween, the respective capacitances between each of said plates and diaphragm being a continuous function of the instantaneous positioning of said diaphragm relative to the two plates and therefore a continuous function of the instantaneous pressure differential between the two containers, an electric circuit including a capacitance bridge with said sensing unit as two legs thereof and a phase comparator to convert the electrical output of said bridge into a D.C. potential the instantaneous amplitude and polarity of which are functions respectively of the amount and direction of diaphragm displacement, said electric circuit further including a series-connected resistor and capacitor constituting a signal change rate network across which said D.C. potential is applied, the resulting D.C. potential developed across said resistor constituting an electric signal the amplitude of which is proportional to the rate of change of the diaphragm and independent of initial positioning of said diaphragm, and a second electric circuit responsive to said signal to indicate the magnitude of any leak in said second container.

2. Apparatus as set forth in claim 1 in which said master container is sealed.

3. Apparatus as set forth in claim 1, which further includes a chamber of variable volume in pneumatic communication wtih said master container, and means for varying the volume of said chamber at a predetermined rate to simulate a pneumatic leak of a predetermined magnitude in said master container.

4. Apparatus as set forth in claim 1, which further includes first and second thermocouples connected in the first electric circuit, said first thermocouple being in heat-exchange relationship with said master container and said second thermocouple being in heat-exchange relationship with said second container whereby the amplitude of said signal is modified in response to any temperature differential between said containers and compensates therefor.

5. Apparatus as set forth in claim 1 in which said second electric circuit includes means for converting said resultant D.C. potential electric signal to a pulsed wave signal.

References Cited in the file of this patent

UNITED STATES PATENTS

| | | |
|---|---|---|
| 1,720,934 | Toleik | July 16, 1929 |
| 2,667,786 | Spaulding | Feb. 2, 1954 |
| 2,691,297 | Kreisel et al. | Oct. 12, 1954 |
| 2,735,368 | Antonazzi | Feb. 21, 1956 |
| 2,807,167 | Statham | Sept. 24, 1957 |
| 2,814,203 | Donohoe | Nov. 26, 1957 |